(12) United States Patent
Yuan et al.

(10) Patent No.: US 8,346,084 B2
(45) Date of Patent: Jan. 1, 2013

(54) OPTICAL DEVICE WITH STABLE OPTICAL CONFIGURATION

(75) Inventors: Haijun Yuan, Pleasanton, CA (US);
Xuehua Wu, Union City, CA (US);
Christopher Lin, El Cerrito, CA (US);
Giovanni Barbarossa, Saratoga, CA (US)

(73) Assignee: Oclaro (North America), Inc., San Jose, CA (US)

( * ) Notice: Subject to any disclaimer, the term of this patent is extended or adjusted under 35 U.S.C. 154(b) by 986 days.

(21) Appl. No.: 11/945,996

(22) Filed: Nov. 27, 2007

(65) Prior Publication Data
US 2008/0218872 A1 Sep. 11, 2008

Related U.S. Application Data

(60) Provisional application No. 60/893,872, filed on Mar. 8, 2007.

(51) Int. Cl.
*H04J 14/02* (2006.01)
(52) U.S. Cl. ............... 398/79; 398/45; 398/82; 398/87; 398/88
(58) Field of Classification Search ............. 398/79, 398/82–88, 45, 48; 385/18
See application file for complete search history.

(56) References Cited

U.S. PATENT DOCUMENTS

| 6,320,996 | B1 | 11/2001 | Scobey et al. | |
|---|---|---|---|---|
| 6,434,291 | B1 | 8/2002 | Kessler et al. | |
| 6,535,311 | B1 * | 3/2003 | Lindquist | 398/82 |
| 6,560,000 | B2 * | 5/2003 | Iyer et al. | 359/238 |
| 6,594,082 | B1 | 7/2003 | Li et al. | |
| 6,941,073 | B2 * | 9/2005 | McGuire | 398/84 |
| 7,058,251 | B2 * | 6/2006 | McGuire, Jr. | 385/16 |
| 7,330,615 | B2 * | 2/2008 | McGuire, Jr. | 385/16 |
| 7,499,608 | B1 * | 3/2009 | Kelly et al. | 385/16 |
| 7,769,255 | B2 * | 8/2010 | Nagy et al. | 385/18 |
| 7,873,246 | B2 * | 1/2011 | Nagy et al. | 385/18 |
| 7,894,722 | B2 * | 2/2011 | Barbarossa | 398/45 |
| 8,000,568 | B2 * | 8/2011 | Presley et al. | 385/18 |

(Continued)

FOREIGN PATENT DOCUMENTS

EP 0 661 573 7/1995

(Continued)

OTHER PUBLICATIONS

Tsai et al., 1 x $N^2$ Wavelength-Selective Switch With Two Cross-Scanning One-Axis Analog Micromirror Arrays in a 4-f Optical System, Journal of Lightwave Technology, vol. 24, No. 2, Feb. 2006, pp. 897-903, XP-002534797.

Leyva et al., Cross-Talk Analysis in a Telecentric Adaptive Free-Space Optical Relay Based on a Spatial Light Modulator, Applied Optics, vol. 45, No. 1, Jan. 1, 2006, pp. 63-75, XP-001237646.

*Primary Examiner* — Kenneth N Vanderpuye
*Assistant Examiner* — Hibret Woldekidan
(74) *Attorney, Agent, or Firm* — Patterson & Sheridan, L.L.P.

(57) ABSTRACT

An optical device for a wavelength division multiplexing system has a telecentric lens system and a signal-processing optical element, where the signal-processing optical element performs switching, attenuation, or other optical signal processing for the optical device. The telecentric lens system acts as a self-compensating optical system to minimize sensitivity of the optical device to unwanted displacement of an input image from the optical axis of the optical device. The optical device may include multiple telecentric lens systems, in which case the optical device is also less sensitive to precise alignment between the telecentric lens systems.

5 Claims, 3 Drawing Sheets

U.S. PATENT DOCUMENTS

| | | | |
|---|---|---|---|
| 8,094,982 B2 * | 1/2012 | Wu et al. | 385/33 |
| 8,131,123 B2 * | 3/2012 | Presley et al. | 385/18 |
| 8,190,025 B2 * | 5/2012 | Presley et al. | 398/48 |
| 2002/0105697 A1 * | 8/2002 | Fabiny | 359/128 |
| 2003/0035605 A1 * | 2/2003 | Bouevitch et al. | 385/1 |
| 2004/0021952 A1 | 2/2004 | Meyers et al. | |
| 2004/0156581 A1 * | 8/2004 | Golub et al. | 385/18 |
| 2005/0213877 A1 * | 9/2005 | Wu et al. | 385/18 |
| 2007/0263426 A1 * | 11/2007 | Hiraga et al. | 365/154 |

FOREIGN PATENT DOCUMENTS

| | | |
|---|---|---|
| WO | WO 01/37021 | 5/2001 |
| WO | WO 2004/010175 | 1/2004 |

* cited by examiner

OPTICAL DEVICE WITH STABLE OPTICAL CONFIGURATION

CROSS-REFERENCE TO RELATED APPLICATIONS

This application claims the benefit of U.S. Provisional Patent Application Ser. No. 60/893,872, filed Mar. 8, 2007, entitled "Wavelength Selective Liquid Crystal Switch," the entire contents of which are incorporated by reference herein.

BACKGROUND OF THE INVENTION

1. Field of the Invention

Embodiments of the present invention relate generally to optical communication systems and, more particularly, to an optical device for wavelength division multiplexing applications.

2. Description of the Related Art

In a wavelength division multiplexing (WDM) optical communication system, information is carried by multiple channels, each channel having a unique wavelength. WDM allows transmission of data from different sources over the same fiber optic link simultaneously, since each data source is assigned a dedicated channel. The result is an optical communication link with an aggregate bandwidth that increases with the number of wavelengths, or channels, incorporated into the WDM signal. In this way, WDM technology maximizes the use of an available fiber optic infrastructure; what would normally require multiple optic links or fibers instead requires only one.

In WDM optical communication systems, it is often necessary to add, drop, or attenuate optical channels within a light beam. This can be achieved by a wavelength selective optical switching device, which directs an input light beam to one of multiple output optical paths. For example, in a 1×2 wavelength selective optical switching device, the optical channels contained in an input light beam enter through an input fiber and are directed to one of two output fibers. There are also more complicated optical switching devices, such as 2×2, 1×N, and N×N switching devices, which are realized by combining several 1×2 devices. In some optical networks, the individual wavelength channels of a WDM input signal are directed to different output fibers by a wavelength selective optical switching device, also known as a wavelength router. Different types of optical switching devices known in the art include wavelength selective switches (WSSs) optical add-drop multiplexers (OADMs), wavelength blocker and dynamic gain equalizers (DGEs).

WDM switching devices commonly include multiple free-space optical systems. These free-space optical systems consist of lenses, mirrors, and other elements, which are optically coupled by regions of vacuum or atmospheric pressure. The optical systems of a WDM switching device must be precisely aligned, since misalignment of these optical systems can cause significant signal loss in the WDM switching device.

Figure 1A:
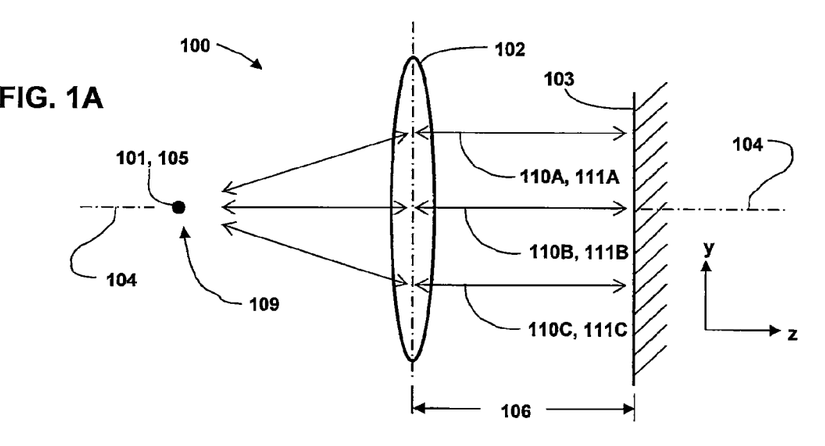
FIGS. 1A, 1B are ray tracing diagrams schematically illustrating the sensitivity to positional displacement of an optical system commonly used in the art.
Figure 1B:
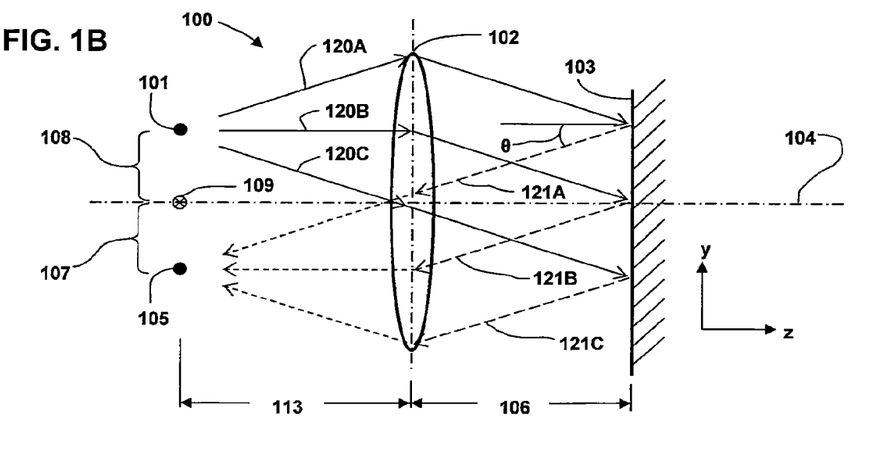

FIGS. 1A, 1B are ray tracing diagrams schematically illustrating the sensitivity to positional displacement of an optical system 100 commonly used in the art. Optical system 100 includes a collimating lens 102, a light entry point 101 and a light exit point 105 positioned on a first side of collimating lens 102, and a reflective element 103 positioned on a second side of collimating lens 102. For simplicity, light entry point 101 is illustrated as essentially a point source of light, such as an input port that is optically coupled to an optical fiber, and directs input rays toward collimating lens 102. Collimating lens 102 optically couples light entry point 101 to reflective element 103.

In FIG. 1A, light entry point 101 of optical system 100 is located at front focal point 109 of collimating lens 102 and therefore is also positioned on optical axis 104, which is an ideal scenario. Input rays 110A-C originate from light entry point 101, which is coincident with front focal point 109. Therefore, collimating lens 102 directs input rays 110A-C to reflective element 103 as collimated rays, i.e., light rays that are parallel to optical axis 104. Because of this, input rays 110A-C have normal incidence on reflective element 103, and output rays 111A-C follow return paths that are identical to the incoming paths of input rays 110A-C, as shown.

In practice, perfect alignment of light entry point 101 with optical axis 104 is problematic. Even if optical system 100 is precisely assembled, misalignment between light entry point 101 and optical axis 104 may still occur due to the relative motion caused by thermal expansion or other mechanical deformation of optical system 101 during operation. In FIG. 1B, light entry point 101 is displaced from optical axis 104 a distance 108 along the y-axis as a result of such deformation. Because light entry point 101 is not positioned coincident with front focal point 109, collimating lens 102 does not direct input rays 120A-C toward reflective element 103 as collimated rays parallel to optical axis 104. Instead, input rays 120A-C have a non-normal angle of incidence θ with reflective element 103, as do output rays 121A-C. Output rays 121A-C therefore do not follow paths coincident with input rays 120A-C, so that light exit point 105 is displaced a distance 107 from front focal point 109 along the y-axis.

The magnitude of distance 107 is a function of distance 108 and the distance 106 between collimating lens 102 and reflective element 103. Because of this, when distance 106 is significantly greater than front focal length 113, even a small value for distance 108 may result in a relatively large value for distance 107. Large displacements between light entry point 101, light exit point 105, and optical axis 104 are undesirable since substantial signal loss can result. For example, when light exit point 105 is intended to correspond to an optical output port positioned on optical axis 104, output rays 121A-C may partially or completely miss the output port, depending on the magnitude of distance 107. FIG. 1B only illustrates displacement of light entry point 101 and light exit point 105 from optical axis 104 in the y-z plane, as indicated. In addition, misalignment of light entry point 101 from optical axis 104 may occur along the x-axis (not shown), which can result in further displacement of light exit point 105 and, therefore, additional signal loss. Hence, optical system 100 is inherently sensitive to the small but unavoidable displacements from optimal alignment of light entry point 101 with the other components of optical system 100.

Accordingly, there is a need in the art for an optical system used in communications networks that is less sensitive to positional alignment over prior art systems.

SUMMARY OF THE INVENTION

Embodiments of the present invention provide an optical device for a wavelength division multiplexing (WDM) system having a telecentric lens system and a signal-processing optical element, where the signal-processing optical element performs switching, attenuation, or other optical signal processing for the optical device. The telecentric lens system acts as a self-compensating optical system to minimize sensitivity of the optical device to unwanted displacement of an input image from the optical axis of the optical device.

In a first embodiment, an optical device for processing a WDM signal comprises at least one telecentric optical system having a plurality of optical elements, wherein one of the optical elements in the telecentric optical system is a light dispersing element for separating the WDM signal into its wavelength components and combining wavelength components of a WDM signal into the WDM signal. The optical device may further comprise another telecentric optical system, wherein said another telecentric optical system is positioned and configured to receive the wavelength components of the WDM signal, process the wavelength components of the WDM signal, and return the processed wavelength components of the WDM signal back to said at least one telecentric optical system.

In another embodiment, an optical device comprises a first telecentric optical system including a light dispersing element for separating an input signal into its wavelength components and a second telecentric optical system for processing the wavelength components of the input signal. The second telecentric optical system may process the wavelength components of the input signal to produce wavelength components of an output signal and the first telecentric optical system may be positioned to receive the wavelength components of an output signal.

In another embodiment, a wavelength selective switch comprises input and output ports, a light dispersing element optically coupled to the input and output ports, and a telecentric optical system. The telecentric optical system includes an optical switch for receiving wavelength components of an input light beam from the light dispersing element, altering the optical paths of the wavelength components of the input light beam, and directing the wavelength components of the input light beam to the light dispersing element after their optical paths have been altered. The optical switch may further comprise a first liquid crystal cell, a first lens assembly, a beam steering unit, a second lens assembly, a second liquid crystal cell, and a light reflecting element.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numerals have been used, where applicable, to designate identical elements that are common between figures. It is contemplated that features of one embodiment may be incorporated in other embodiments without further recitation.

DETAILED DESCRIPTION

Embodiments of the invention contemplate an optical device for a wavelength division multiplexing system that includes a telecentric lens system, i.e., the chief rays for all points across an object or image are parallel to the optical axis of the system. The telecentric lens system acts as a self-compensating optical system to minimize sensitivity of the optical device to unwanted displacement of the image from the optical axis of the optical device.

Figure 2A:
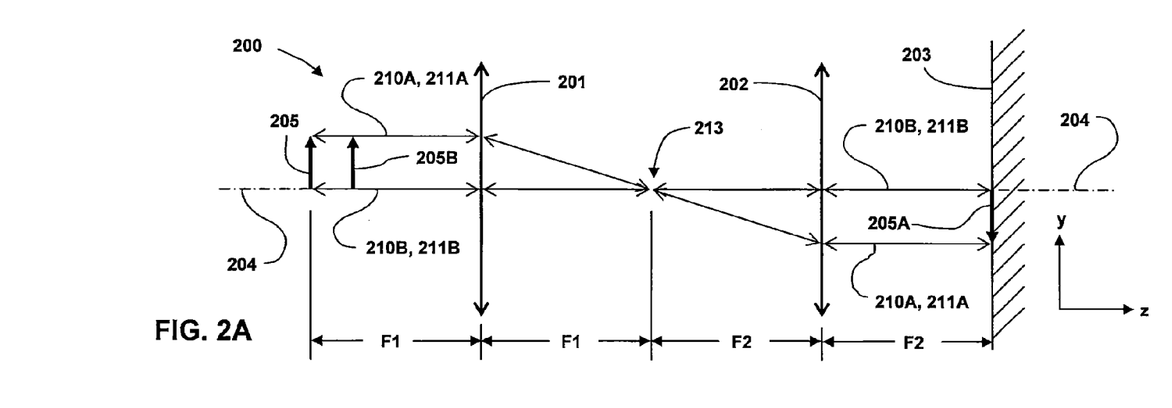
FIG. 2A illustrates the ray tracing for an ideal configuration of an optical system.
Figure 2B:
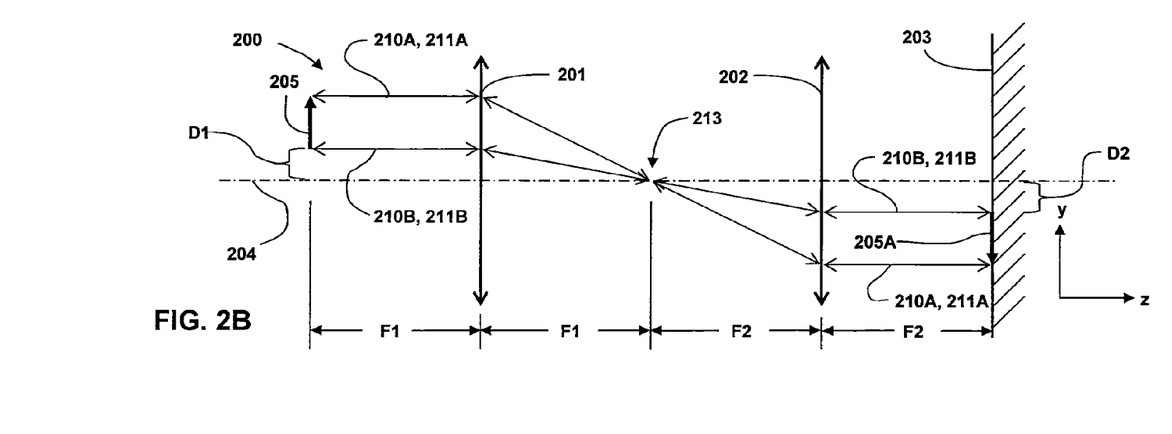
FIG. 2B illustrates the ray tracing for an optical system, where an image is displaced from an optical axis.

FIGS. 2A, 2B schematically illustrate a bi-directional telecentric optical system that is incorporated into embodiments of the invention. Optical system 200 includes a first lens 201 having a focal length F1, a second lens 202 having a focal length F2, and a signal-processing optical element 203. First lens 201, second lens 202, and signal-processing optical element 203 are positioned along an optical axis 204 as shown. First lens 201 and second lens 202 are separated by a distance equal to the sum of focal length F1 and focal length F2, and signal-processing optical element 203 is separated from second lens 202 by a distance equal to focal length F2.

First lens 201 and second lens 202 are positive lenses and may be either simple or compound lenses. Signal-processing optical element 203 is an optical element or assembly configured to process incident light rays as required. In operation, an image 205 is located a distance equal to focal length F1 from first lens 201 and is projected onto signal-processing optical element 203 via the input rays 210A, 210B to form image 205A. For illustrative purposes, image 205, image 205A, and an output image 205B are depicted as physical objects, i.e., focused 2-dimensional images in the y-z plane. For a WDM switching device, image 205, image 205A, and output image 205B are each essentially a point source, such as a light beam projected from a small diameter optical fiber.

In the example illustrated in FIGS. 2A, 2B, signal-processing optical element 203 includes one or more signal-processing elements, such as a prism, filter, polarizer, etc., which process incident light, i.e., input light rays 210A, 210B, to produce the output light rays 211A, 211B that form output image 205B. Signal-processing optical element 203 also includes a reflective element positioned perpendicular to optical axis 204. Alternatively, an additional signal-processing optical element (not shown) may be positioned between first lens 201 and second lens 202 at coincident focal point 213 to perform conditioning of input light rays 210A, 210B or output light rays 211A, 211B that preferably takes place at a focal point. For example, the additional signal-processing optical element may be an LC-array adapted to condition the polarization of input light rays 210A, 210B and output light rays 211A, 211B.

In other examples, signal-processing optical element 203 may be a transmissive optical element, such as a lens or prism. Because signal-processing optical element 203 is located in the focal plane of second lens 202, image 205A may serve as the input image for an adjacent bi-directional optical system (not shown), just as image 205 is an input image for optical system 200.

Ray tracing for an ideal configuration of optical system 200 is illustrated in FIG. 2A. The image-space telecentric lens system consisting of first lens 201 and second lens 202 performs a collimating function similar to collimating lens 102 in FIG. 1. Image 205 is positioned on optical axis 204 and is located at the front focal plane of first lens 201. For clarity, only the chief rays from the top point and bottom point of images 205, 205A, and output image 205B are illustrated. Because the rear focal plane of first lens 201 is coincident with the front focal plane of second lens 202 at coincident focal point 213, first lens 201 and second lens 202, in combination, form an image-space telecentric lens system. Input light rays 210A, 210B have normal incidence to signal-processing optical element 203, and output light rays 211A, 211B follow essentially identical optical paths to those followed by input light rays 210A, 210B.

FIG. 2B illustrates the ray tracing for optical system 200, where image 205 is displaced from optical axis 204 by a displacement D1. Image 205A has a displacement D2 from optical axis 204 that is proportional to displacement D1 by a factor equal to the ratio of focal length F2 to focal length F1, as shown, since in combination first lens 201 and second lens 202 form an image-space telecentric lens system. Because input light rays 210A, 210B have normal incidence to signal-processing optical element 203, the optical paths of output light rays 211A, 211B are essentially identical to the optical paths of input light rays 210A, 210B. In addition, output image 205B also has displacement D1 from optical axis 204, and therefore the light entry point and exit point of optical system 200 are in the same location, regardless of the magnitude of displacements D1, D2. In this way, the sensitivity of optical system 200 to small displacements of image 205 relative to optical axis 204 is virtually eliminated.

For example, an assembly containing an optical input and an optical output port may be optically coupled to optical system 200. Due to mechanical deformation, thermal expansion, or other relative motion between the assembly and optical system 200, a displacement equal to displacement D1 may be produced, thereby shifting image 205 from optical axis 204 as shown in FIG. 2B. Because output image 205B is displaced the same distance from optical axis 204 as the optical input port, i.e., by displacement D1, no misalignment between the output port and output light rays 211A, 211B will take place. FIG. 2B illustrates the self-compensating nature of optical system 200 with respect to displacement D1 of image 205 from optical axis 204 in the y-z plane, as indicated. Similarly, embodiments of the invention contemplate a similar approach for minimizing the sensitivity of optical system 200 to displacements in the x-z plane as well. This system is also insensitive the angular drifting of signal processing optical element 203. When element 203 rotates by a small angle such that output light rays 211A and 211B are offset at an angle from input light rays 210A and 210B, the output image 205B still coincides with the input image 205.

Figure 3:
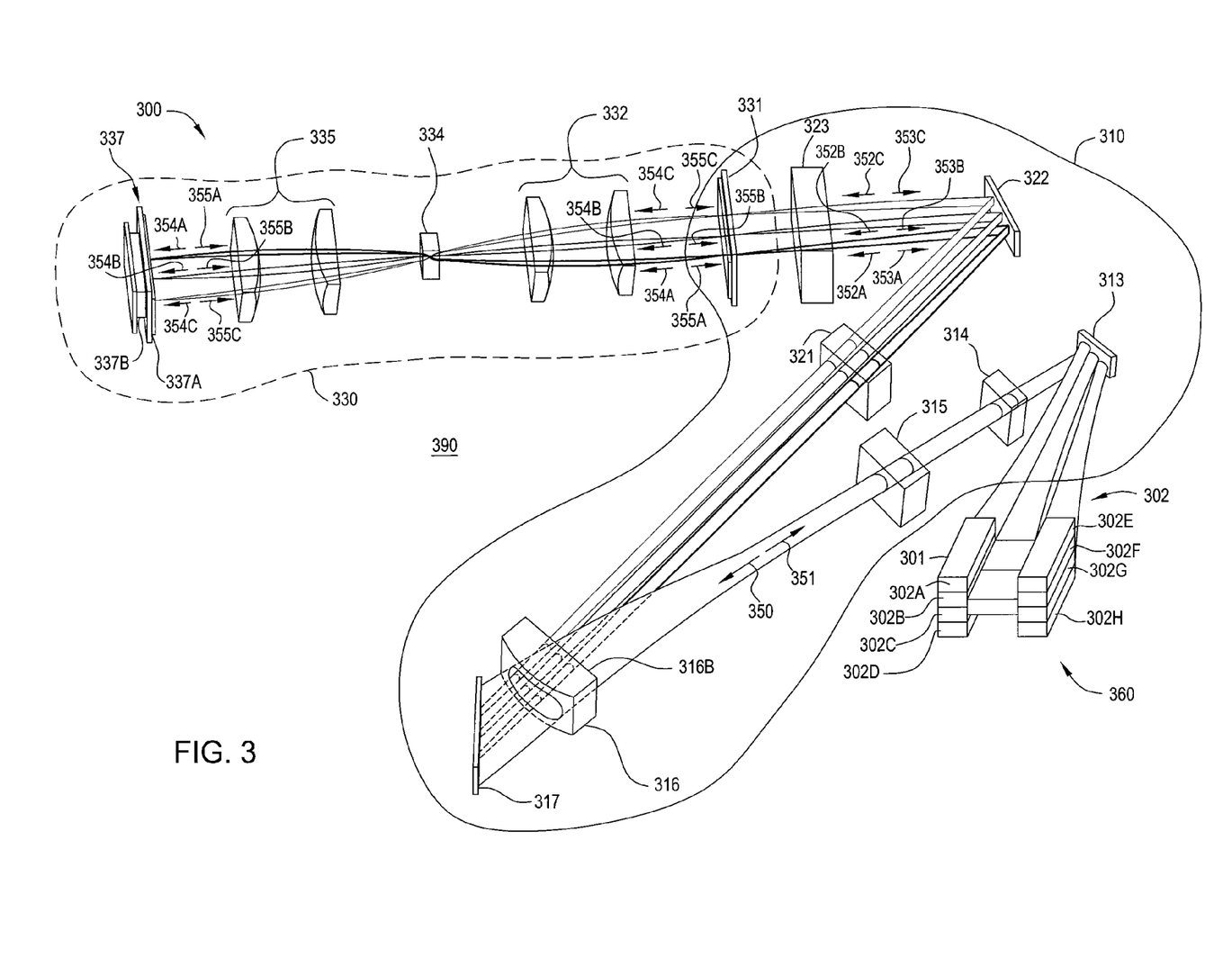
FIG. 3 is a vertical plan view of an optical switching device configured with telecentric optical systems, according to an embodiment of the invention.

FIG. 3 is a vertical plan view of an optical switching device configured with telecentric optical systems, according to an embodiment of the invention. WSS 300 is a 1×4 wavelength selective switch and includes an optical input/output assembly 360, a base unit 310, and a switching optics assembly 330. The components of WSS 300 are mounted on a planar surface 390 that is herein defined as the horizontal, or x-z, plane for purposes of description. The z-axis is defined as parallel to the optical axis of an optical system, the x-axis is defined as perpendicular to the optical axis of the optical system, and the vertical, or y-axis, is normal to the x-z plane. Hence, planar surface 390 is substantially parallel to the plane traveled by light beams interacting with WSS 300. The configuration of WSS 300 described herein performs wavelength separation of a WDM signal in the horizontal plane and switching selection, i.e., channel routing, in the vertical plane. The telecentric optical systems included in WSS 300 minimize the sensitivity of WSS 300 to unwanted relative motion and/or other positional displacement between optical input/output assembly 360, base unit 310, and switching optics assembly 330 in both the horizontal and vertical planes, as described below.

For illustrative purposes, inbound light beams 350, 352A-C, 354A-C, and outbound light beams 351, 353A-C, 355A-C are shown in FIG. 3 to more clearly indicate the optical coupling of various elements of WSS 300. Diffraction grating 317 is shown to separate inbound beam 350 into three inbound beams 352A-C. However, in practice, the number of optical channels contained in inbound beam 350 may be up to 50 or more. Because of the bi-directional nature of most components of WSS 300, light beams are directed along parallel inbound and outbound paths simultaneously between optical components of WSS 300. The inbound and outbound paths are displaced from each other vertically, as a result of processing of inbound beams 352A-C by switching optics assembly 330. Because FIG. 3 is a vertical plan view, a single light beam is used to schematically represent both an inbound and outbound light beam between two optical components of WSS 300. For example, a single light beam between folding mirror 313 and diffraction grating 317 schematically represents inbound light beam 350 and outbound light beam 351.

Optical input/output assembly 360 optically couples a WDM optical input signal from a communications network to WSS 300 and four optical output signals from WSS 300 back to the communications network. Optical input/output assembly 360 includes an optical input port 301 and an optical output port array 302. Optical output port array 302 includes four vertically aligned optical output ports 302A-D and four vertically aligned loss ports 302E-H. Optical output ports 302A-D act as the optical output interface between WSS 300 and other components of a WDM optical communication system. Loss ports 302E-H serve as termini for light beams consisting of unwanted optical energy, for example wavelength channels blocked from a WDM output signal. Optical input port 301 acts as the optical input interface between WSS 300 and other components of a WDM optical communication system, is vertically aligned with optical output ports 302A-D, and is centered between output ports 302B and 302C. Because the polarization state of the WDM optical input signal may be arbitrary and/or unknown, optical input/output assembly 360 also includes a polarization management optics assembly (not shown) configured to adjust the polarization of the WDM optical input signal to a single, known state, i.e., linearly polarized in a known direction.

Base unit 310 is made up of a plurality of free-space optical elements, including a folding mirror 313, beam steering unit 314, cylindrical lenses 315 and 316, a diffraction grating 317, cylindrical lens 321, a folding mirror 322, a cylindrical lens 323, and a polarization switching unit 331. Base unit 310 optically couples optical input/output assembly 360 with switching optics assembly 330. In directing inbound light beams to switching optics assembly 330, base unit 310 shapes inbound beam 350, separates inbound beam 350 into inbound beams 352A-C, and shapes and focuses inbound beams 352A-C onto polarization switching unit 331. In directing outbound light beams back to optical input/output assembly 360, base unit 310 shapes outbound beams 353A-C, combines outbound beams 353A-C into outbound beam 351, and directs outbound beam 351 to a loss port and/or an optical output port contained in optical output port array 302, depending on the polarization state of outbound beams 353A-C. Inbound beam 350 and outbound beam 351 each contain a plurality of wavelength channels that are multiplexed into a single, "white" beam.

Beam steering unit 314 is configured to direct outbound beam 351 along two different optical paths depending on the polarization state of outbound beam 351. Because outbound beam may contain s-polarized and/or p-polarized light, a portion of outbound beam 351 may be directed along each optical path. The two paths may be separated in the horizontal plane by an angular or translational offset. In the example illustrated, beam steering unit 314 is a Wollaston prism, which angularly deflects light beams along different optical paths depending on the orthogonal polarization states of the light beams. Alternatively, beam steering unit 314 may be a birefringent crystal, such as a YV0$_4$ crystal, which translationally deflects the light beams by different amounts depending on their orthogonal polarization states. It is understood that because inbound beam 350 contains light of a single polarization state, beam steering unit 314 directs inbound beam 350 to diffraction grating 317 along a single optical path.

Cylindrical lens 315 vertically collimates inbound beam 350, and cylindrical lens 316 horizontally collimates inbound beam 350. Together, cylindrical lenses 315, 316 shape inbound beam 350 so that the beam is elliptical in cross-section and collimated in the x- and y-directions when incident on diffraction grating 317, where the major axis of the ellipse is parallel with the horizontal plane. In cross-section, the optical surfaces of cylindrical lenses 315, 316 are circular. The degree of collimation and the length of the major axis of the elliptical cross-section of inbound beam 350 define the spectral resolution of diffraction grating 317, as described below. In addition, cylindrical lens 315 and cylindrical lens 316 horizontally focus outbound beam 351 onto optical output port array 302. Another function of cylindrical lens 316 is, in conjunction with cylindrical lens 323, to focus inbound beams 352A-C onto switching optics assembly 330.

Diffraction grating 317 is a vertically aligned reflective diffraction grating configured to spatially separate, or demultiplex, each wavelength channel of inbound beam 350 by directing each wavelength of light contained in inbound beam 350 along a unique optical path. In so doing, diffraction grating 317 forms a plurality of inbound beams, wherein the number of inbound beams corresponds to the number of optical wavelength channels contained in inbound beam 350. In FIG. 3, diffraction grating 317 is shown to separate inbound beam 350 into three inbound beams 352A-C. However, in practice, the number of optical channels contained in inbound beam 350 may be up to 50 or more. Because the separation of wavelength channels by diffraction grating 317 takes place horizontally in the configuration shown in FIG. 3A, spectral resolution of diffraction grating 317 is enhanced by widening inbound beam 350 in the horizontal plane, as performed by cylindrical lens 316. Diffraction grating 317 may be a ruled or holographic reflective grating.

Diffraction grating 317 also performs wavelength combination, referred to as multiplexing, of outbound beams 353A-C, which have elliptical cross-sections, into outbound beam 351. Cylindrical lenses 315, 316 reshape and focus outbound beam 351, which initially has an elliptical cross-section, into a substantially circular beam as it travels through them in a direction that is reverse to that of inbound beam 350.

Cylindrical lens 321 and cylindrical lens 323 are cylindrical lenses substantially similar to cylindrical lenses 315 and 316, and have optical surfaces that are circular in cross-section. Together, cylindrical lens 321 and cylindrical lens 323 shape inbound beams 352A-C and outbound beams 353A-C. Inbound beams 352A-C are elliptically shaped and collimated when they first emanate from diffraction grating 317. As the light beams pass through cylindrical lens 316 toward cylindrical lens 321, the shape of the inbound beams 352A-C becomes substantially circular and focused. Cylindrical lens 316 focuses inbound beams 352A-C in the horizontal direction, and cylindrical lens 321 focuses inbound beams 352A-C in the vertical direction. Conversely, outbound beams 353A-C are re-shaped from circular to elliptical as they follow a reverse path through cylindrical lens 321, cylindrical lens 323, and cylindrical lens 316. Folding mirror 322 redirects inbound beams 352A-C and outbound beams 353A-C for a more compact configuration of WSS 300. Because the conditioning of inbound beams 352A-C by polarization switching unit 331 optimally takes place at a focal point of inbound beams 352A-C, cylindrical lens 316 and cylindrical lens 323 are configured and positioned to horizontally focus inbound beams 352A-C on polarization switching unit 331, i.e., along the x-axis. Similarly, cylindrical lens 315 and cylindrical lens 321 are configured and positioned to vertically focus inbound beams 352A-C on polarization switching unit 331, i.e., along the x-axis. The organization and operation of polarization switching unit 331 is described below in conjunction with switching optics assembly 330.

Free-space optical elements of base unit 310 make up a telecentric optical system in the vertical, i.e., the y-z plane, similar to optical system 200 conceptually illustrated in FIGS. 2A, 2B, extending from optical input/output assembly 360 to polarization switching unit 331. As described above, an image originating from optical input port 301, i.e., input beam 350, is collimated and directed onto diffraction grating 317. The collimated light beams leaving diffraction grating 317, i.e., inbound light beams 352A-C, correspond to image 205 and input rays 210A, 210B of optical system 200, cylindrical lens 321 corresponds to first lens 201, and polarization switching unit 331 is positioned at a point corresponding to coincident focal point 213 of optical system 200. Similarly, each of outbound light beams 353A-C corresponds to output light rays 211A, 211B of optical system 200, and originate at coincident focal point 213. Optical input port 301 is positioned at the front focal plane of cylindrical lens 315, and polarization switching unit 331 is positioned at the rear focal plane of cylindrical lens 321. The y-z plane telecentric optical system so described is beneficial due to the sensitivity of WSS 300 to vertical displacements between optical input/output assembly 360 and base unit 310, and between base unit 310 and switching optics assembly 330.

Similarly, optical elements of base unit 310 make up a telecentric optical system in the horizontal, i.e., the x-z plane, extending from diffraction grating 317 to polarization switching unit 331. The x-z plane telecentric optical system contained in base unit 310 between diffraction grating 317 and polarization switching unit 331 ensures that the principal axes of inbound beams 352A-C are parallel to each other and normally incident to the surface of polarization switching unit 331.

In operation, if optical input/output assembly 360 undergoes unwanted vertical displacement relative to base unit 310, no significant signal loss occurs. This is because base unit 310 is a telecentric optical system in the y-z plane. Therefore, when optical input/output assembly 360 is vertically displaced from the optical axis of base unit 310, inbound beams 350 and outbound beams 351 are displaced in the same direction and for the same distance. Because optical input port 301 and optical output port array 302 are, as an assembly, displaced the same amount, no misalignment occurs between outbound beam 351 and optical output ports 302A-D of optical output port array 302.

Switching optics assembly 330 forms another telecentric optical system, and includes an LC-based polarization switching unit 331, a first lens set 332, a beam steering unit 334, a second lens set 335 and an LC-based beam displacer assembly 337. The elements of switching optics assembly 330 are optically linked to enable the optical routing of a WDM optical input signal entering optical input port 301 to any one of the optical output ports 302A-D or loss ports 302E-H in optical output port array 302. The optical routing is performed by conditioning (via LC polarization) and vertically displacing inbound beams 352A-C to produce outbound beams 353A-C. Switching optics assembly 330 selectively determines the vertical displacement of outbound beams 353A-C to correspond to the vertical position of the desired output port, i.e., optical output port 302A, 302B, 302C, or 302D, hence performing a 1×4 optical switching operation.

Polarization switching unit 331 is an LC switching array adapted to selectively rotate the polarization of each incoming wavelength channel, i.e., inbound beams 352A-C, to produce inbound beams 354A-C. Polarization switching unit 331 is also configured to condition the polarization state of outbound beams 355A-C so that each beam, and therefore each wavelength channel recombined into outbound beam 351, may be independently attenuated or directed to one of loss ports 302E-H.

First lens set 332 is made up of one or more lenses configured to direct and focus inbound beams 354A-C onto beam steering unit 334, and to direct and focus outbound beams 355A-C onto polarization switching unit 331 with minimal aberration. In the example illustrated in FIG. 3, two spherical lenses are shown. In other configurations, the function of first lens set 332 may be combined into a single lens. Alternatively, three or more lenses may be used.

Beam steering unit 334 is configured to direct inbound beams 354A-C along two different optical paths, i.e., an upper and a lower path, depending on the polarization state of the beams. As noted above, the polarization state of inbound beams 354A-C is determined by the polarization conditioning performed by polarization switching unit 331. The two optical paths are separated angularly or by a translational offset in the vertical direction. In either case, the vertical offset between the two possible paths for inbound beams 354A-C indicates that inbound beams 354A-C may be directed to either an upper or lower region of beam displacer assembly 337. Beam steering unit 334 is also configured to direct outbound beams 355A-C back through polarization switching unit 331. Similar to beam steering unit 314, beam steering unit 334 may be a Wollaston prism or other angular polarization splitter or a birefringent crystal. In contrast to beam steering unit 314, beam steering unit 334 is oriented to impart an angular or translational deflection to beams in the vertical direction rather than the horizontal direction.

Second lens set 335 is substantially similar in make-up to first lens set 332, and is configured to direct and focus inbound beams 354A-C from beam steering unit 334 onto beam displacer assembly 337. When inbound beams 355A-C travel along an upper optical path as directed by beam steering unit 334, second lens set 335 directs and focuses the beams onto an upper region of beam displacer assembly 337. On the other hand, when inbound beams 355A-C travel along a lower optical path as directed by beam steering unit 334, second lens set 335 directs and focuses the beams onto a lower region of beam displacer assembly 337. Second lens set 335 is also configured to direct outbound beams 355A-C from beam displacer assembly 337 to beam steering unit 334. In the example illustrated in FIG. 3, two lenses are shown. In other configurations, one lens or more than two lenses may perform the function of second lens set 335.

Beam displacer assembly 337 includes an LC array 337A and a beam displacer 337B. LC array 337 is adapted to selectively rotate the polarization of inbound beams 354A-C and beam displacer 337B reflects and directs each of inbound beams 354A-C along either of two different parallel optical paths to produce outbound beams 355A-C. Outbound beams 355A-C are separated by a vertical offset, depending on the polarization conditioning by LC array 337A. Since each of inbound beams 354A-C may be directed to beam displacer assembly 337 along two possible sets of optical paths from beam steering unit 334, i.e., an upper path or lower path, outbound beams 355A-C may be directed from beam displacer assembly 337 along any of four vertically displaced optical path sets.

Switching optics assembly 330 forms two telecentric optical systems, one in the vertical, i.e., the y-z plane, and one in the horizontal, i.e., the x-z plane, each of which is similar in concept to optical system 200 illustrated in FIGS. 2A, 2B. For both the y-z and x-z telecentric systems formed by switching optics assembly 330, polarization switching unit 331 is positioned at a point corresponding to coincident focal point 213 in optical system 200. Similarly, first lens set 332 corresponds to second lens 202 in optical system 200 for both the y-z and x-z telecentric systems. Further, beam steering unit 334 corresponds to signal-processing optical element 203 of optical system 200 for both the y-z and x-z telecentric systems.

Second lens set 335 and beam displacer assembly 337 make up an additional telecentric subsystem coupled to the telecentric optical systems formed by polarization switching unit 331, first lens set 332, and beam steering unit 334. In this additional telecentric subsystem, beam steering unit 334 is positioned in a location corresponding to image 205 of optical system 200, second lens set 335 corresponds to first lens 201 of optical system 200, and beam displacer assembly 337 is positioned at a point corresponding to coincident focal point 213 of optical system 200. Because beam displacer assembly 337 includes a reflective element, each of inbound beams 354A-C corresponds to input rays 210A, 210B in FIG. 2A between image 205 and coincident focal point 213, and each of outbound beams 355A-C corresponds to output light rays 211A, 211B in FIG. 2A between image 205 and coincident focal point 213.

Because the optical components of WSS 300 are configured as telecentric optical systems, WSS 300 is significantly less sensitive to unwanted vertical and horizontal displacements between base unit 310 and switching optics assembly 330, and between base unit 310 and optical input/output assembly 360. For example, when optical input/output assembly 360 undergoes unwanted vertical displacement from the ideal optical axis of WSS 300, inbound beam 350 is also displaced therefrom. Because base unit 310 and switching optics assembly 330 are telecentric optical systems, the unwanted displacement is translated to all other inbound and outbound beams, including outbound beam 351. In this way, no misalignment or signal loss occurs between outbound beam 351 and optical output port array 302, since optical output port array 302 undergoes the same displaced from the ideal optical axis of WSS 300 as outbound beam 351. Hence, only positional displacements larger than the size of the LC pixels of switching optics assembly 330, e.g., on the order of 100's of micrometers, will result in signal loss.

In a similar fashion, other WDM wavelength routers, such as optical add-drop multiplexers or dynamic gain equalizers, may also benefit by organizing optical components into one or more telecentric lens systems. In so doing, a WDM optical device is less sensitive to precise alignment of an input image to the optical axis of the device and to precise alignment between the telecentric lens systems in the device.

While the foregoing is directed to embodiments of the present invention, other and further embodiments of the invention may be devised without departing from the basic scope thereof, and the scope thereof is determined by the claims that follow.

What is claimed is:

1. A wavelength selective switch comprising:
input and output ports;
a light dispersing element optically coupled to the input and output ports; and
a telecentric optical system including an optical switch for receiving wavelength components of an input light beam from the light dispersing element, altering the optical paths of the wavelength components of the input light beam, and directing the wavelength components of the input light beam to the light dispersing element after their optical paths have been altered,
wherein the optical switch comprises a switching array, a first liquid crystal cell, a first lens assembly, a beam steering unit, a second lens assembly, a second liquid crystal cell, and a light reflecting element, the first lens assembly and the second lens assembly being positioned so that a distance between an input optical plane of the telecentric optical system and the first lens assembly and a distance between the first lens assembly and the beam steering unit are each equal to a focal length of the first lens assembly, and a distance between the beam steering unit and the second lens assembly and a distance between the second lens assembly and the light reflecting element are each equal to a focal length of the second lens assembly, and
wherein the telecentric optical system further comprises a first lens having a first focal length, and a second lens having a second focal length, the first lens and the second lens having a coincident focal point, and the switching array being positioned at the coincident focal point.

2. The wavelength selective switch according to claim 1, wherein the first lens assembly is configured to have the same focal length in all planes that are orthogonal to the optical axis of the telecentric optical system, and the second lens assembly is configured to have the same focal length in all planes that are orthogonal to the optical axis of the telecentric optical system.

3. The wavelength selective switch according to claim 2, wherein the first lens assembly comprises a spherical lens and the second lens assembly comprises a spherical lens.

4. The wavelength selective switch according to claim 1, wherein the switching array includes liquid crystal pixels.

5. A wavelength selective switch comprising: input and output ports;
a light dispersing element optically coupled to the input and output ports;
a telecentric optical system including an optical switch for receiving wavelength components of an input light beam from the light dispersing element, altering the optical paths of the wavelength components of the input light beam, and directing the wavelength components of the input light beam to the light dispersing element after their optical paths have been altered, wherein the optical switch comprises a switching array, and wherein the telecentric optical system further comprises a first lens having a first focal length, and a second lens having a second focal length, the first lens and the second lens having a coincident focal point, and the switching array being positioned at the coincident focal point;
optical elements between the telecentric optical system and the light dispersing element that are arranged so that wavelength components of the input light beam that are directed out of the telecentric optical system are focused onto the light dispersing element; and
a third lens between the input and output ports and the light dispersing element and a fourth lens between the light dispersing element and the telecentric optical system, wherein the third lens and the fourth lens are configured and positioned to form another telecentric optical system between the input and output ports and the optical switch.

* * * * *